US012586967B2

(12) United States Patent
Jia Jun

(10) Patent No.: US 12,586,967 B2
(45) Date of Patent: Mar. 24, 2026

(54) 6-IN-1 UNIVERSAL CABLE

(71) Applicant: Teh Jia Jun, George Town (MY)

(72) Inventor: Teh Jia Jun, George Town (MY)

( * ) Notice: Subject to any disclaimer, the term of this patent is extended or adjusted under 35 U.S.C. 154(b) by 309 days.

(21) Appl. No.: 18/474,528

(22) Filed: Sep. 26, 2023

(65) Prior Publication Data

US 2025/0105568 A1 Mar. 27, 2025

(51) Int. Cl.
*H01R 31/06* (2006.01)
*H01R 27/00* (2006.01)

(52) U.S. Cl.
CPC ............. *H01R 31/06* (2013.01); *H01R 27/00* (2013.01)

(58) Field of Classification Search
CPC ................................ H01R 31/06; H01R 27/00
See application file for complete search history.

(56) References Cited

U.S. PATENT DOCUMENTS

| | | | | |
|---|---|---|---|---|
| 9,219,340 | B2 * | 12/2015 | McSweyn | H01R 27/00 |
| 9,478,928 | B1 * | 10/2016 | Cao | H01R 31/06 |
| 9,935,391 | B2 * | 4/2018 | Wang | H01R 13/514 |
| 10,027,080 | B2 * | 7/2018 | Solland | H01R 29/00 |
| 11,025,019 | B1 * | 6/2021 | Cheng | H01R 27/00 |
| 2013/0171864 | A1 * | 7/2013 | Farris-Gilbert | H01R 31/06 439/445 |
| 2014/0106590 | A1 * | 4/2014 | Wu | H01R 27/00 439/284 |

OTHER PUBLICATIONS

Rolling Square inCharge 6-in-1 Charger cable Nov. 2, 2022 https://www.amazon.com/gp/product/BOBKGMCJHX/ref=ox_sc_act_title_1?smid=AFKD57VIWIT7R&th=1 (Year: 2022).*

* cited by examiner

*Primary Examiner* — Briggitte R. Hammond

(57) ABSTRACT

A universal cable, equipped with selectively alterable connection types at both ends, enhancing compatibility and facilitating seamless electrical signal transmission across varied devices with diverse connection requirements. The ergonomic design ensures adaptability to confined spaces. The first end of the cable can alternate between two connection types, enabled by a unique extendable slide mechanism that allows rotational adjustments of the distal portion. The second end offers selection amongst three connection types, mirroring the functional characteristics of the first end. Connection types, inclusive of USB-A, USB-C, Lightning Cable, and Micro USB, among others, underscore the cable's universal applicability. Magnetic or ferromagnetic portions within both ends ensure stable, secure, and easily detachable connections. The design prioritizes structural integrity with rotational limits and potential for secure locking mechanisms contributing to reliable and consistent connectivity solutions in diverse contexts and applications.

7 Claims, 5 Drawing Sheets

6-IN-1 UNIVERSAL CABLE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Field of the Invention

This invention relates to a USB (Universal Serial Bus) cable for connecting an external apparatus such as a mobile phone with a USB port of a PC (Personal Computer). More particularly the invention relates to a USB cable that can charge a battery of an external apparatus with unique adapter mechanisms, combining USB-C, Lightning and Micro-USB connectors in an ergonomic way.

Description of the Related Art

Rechargeable batteries come in many types. Different batteries using different chemical materials require different methods of recharging. Current battery chargers are designed to be used for only one type of battery. For example, a lithium-ion battery requires a different battery charger than a nickel-cadmium battery. Each battery charger is configured only for one purpose, such as to maintain a constant voltage, a constant current, or a predetermined charging algorithm that may vary the voltage or current. More sophisticated battery chargers may use a charging algorithm to charge a battery quickly at first, then slow down the rate of charge as the battery nears full charge. By looking at prior art, various advancements have been seen providing charging cables and devices facilitating the above-mentioned requirements.

U.S. Pat. No. 4,006,396, issued in 1977, shows a universal charger for multiple types of batteries, with circuits for different charging rates. U.S. Pat. No. 5,828,966, issued in 1998, claims a reconfigurable cradle with interchangeable supports to charge different types of mobile phones which may have two or three connectors, and which may have the connectors at the top, bottom or sides. Duracell's 1997 U.S. Pat. No. 5,828,966 describes a universal charger with multiple male tabs for engaging a different number of female slots on different batteries. Palm, Inc.'s 2003 U.S. Pat. No. 6,614,206 describes a charger with multiple USB connections for providing charge to multiple devices.

U.S. Pat. No. 6,894,457 is directed to a charger with multiple cords for charging multiple portable devices. U.S. Pat. No. 5,157,319 shows an induction charger with a magnetic core surrounding the induction coil.

Gomadic's new Universal USB Travel Charger Adapter with Power Surge Protection has a plug which fits any standard AC wall outlet, and a USB port for providing power to a PDA. The USB end of a Power Sync cable is plugged into the integrated USB socket and the adapter is plugged into a standard AC wall outlet.

U.S. Pat. No. 6,211,649B1 is directed to a USB cable according to the present invention has a USB connector connected with a USB port of a PC (Personal Computer), a phone connector connected with a connector of an external connector such as a mobile phone, a control unit, which is situated between the USB connector and the phone connector, for charging a battery of the mobile phone by using power supplied from the USB port of the PC and for transmitting and receiving data with the PC and the mobile phone, and a cable for connecting the USB connector and the phone connector with the control unit respectively.

A Universal USB Charger Kit for Cell Phones from CellPhoneShop.net plugs into a cigarette lighter of a car, and provides a USB connector for providing power. It also provides Motorola, Nextel, Nokia, Samsung, Sony Ericsson cell phone jack connectors. It allows charging a phone through any USB-powered port, with a 5-volt output.

Different devices to be charged use different charging profiles. The charging profile indicates the rate at which charges apply to the device in the form of current per unit of time, as well as the voltage at which the charge is applied. Some devices, such as cordless phones, portable CD players and similar consumer goods, use a slow charger, while other devices, such as cell phones, laptops, and camcorders, use a quick charger. For many devices, it is important to detect when the device is fully charged, so that the battery is not overcharged, thereby causing damage to the battery. Furthermore, each device can be different from other devices in terms of its receiving ports. Thus, one single universal cable providing charging for all types of smart devices is not seen in the prior art.

In short, there are multiple inventions that have been proposed in prior art. However, these solutions are limited and restricted to their conventional architecture and system. The proposed system provides a 6-in-1 universal charging cable with unique adapter mechanisms, combining USB-C, Lightning, and Micro-USB connectors in an ergonomic way.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

BRIEF SUMMARY OF THE INVENTION

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

It is therefore the purpose of the invention to alleviate at least to some extent one or more of the aforementioned problems of the prior art and/or to provide the relevant public with a suitable alternative thereto having relative advantages.

The primary object of the invention is related to an innovative 6-in-1 universal charging cable with unique adapter mechanisms, combining USBC, Lightning and Micro-USB connectors in an ergonomic way.

It is a further objective of the invention to provide a 6-in-1 universal cable that combines all mainstream connectors on the market into a single cable, enabling users to charge all their devices with ease.

It is moreover the objective of the invention to provide a USB-C to USB-C cable with support for up to 100 W Power Delivery and 5 Gbps data transfer (USB 3.0 standard).

It is also the objective of the invention to provide a universal charging cable wherein one side of the USB-C is paired with a USB-A adapter for older devices, while the other end of the USB-C cable features a Lightning and Micro-USB adapter.

It is a further objective of the invention to provide Lightning and Micro-USB adapters with a 360-degree rotatable axis, enabling users to switch between all three connectors quickly.

It is moreover the objective of the invention to provide a cable that is designed to be a keychain accessory, with magnets between the USB-C connectors allowing it to remain closed on the user's keychain.

It is also the objective of the invention to add a swivel feature to allow the user to rotate it to the side, also up and down to increase versatility.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
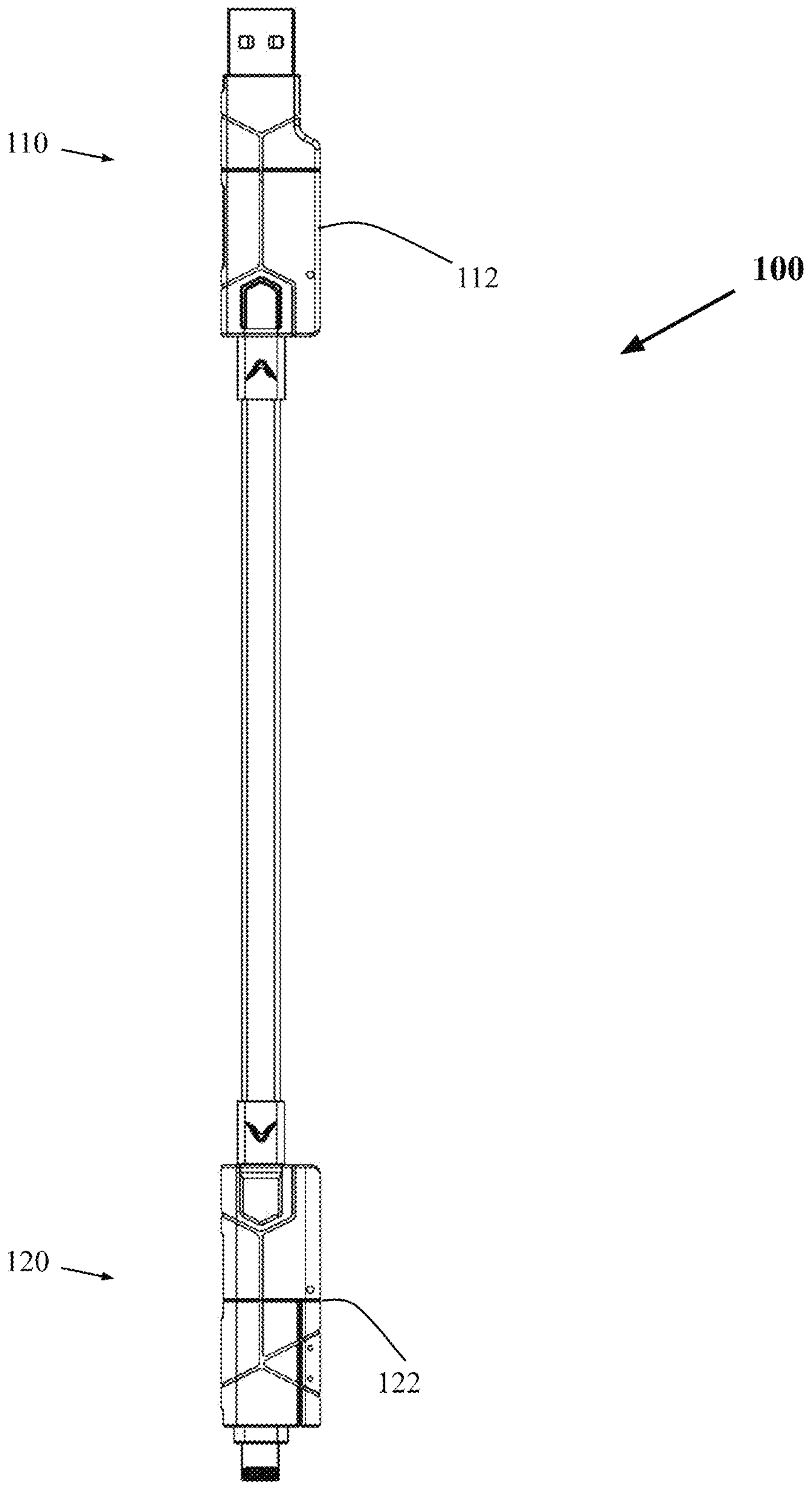
FIG. 1 illustrates a top plan view of the complete assembly according to the preferred embodiment of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The current invention in its preferred embodiment discloses an advancement in charging cables. The assembly shows a universal 6-in-1 charging cable design that has unique adapter mechanisms, combining USBC, Lightning, and Micro-USB connectors in an ergonomic way.

Overview and Terminology

Figure 2:
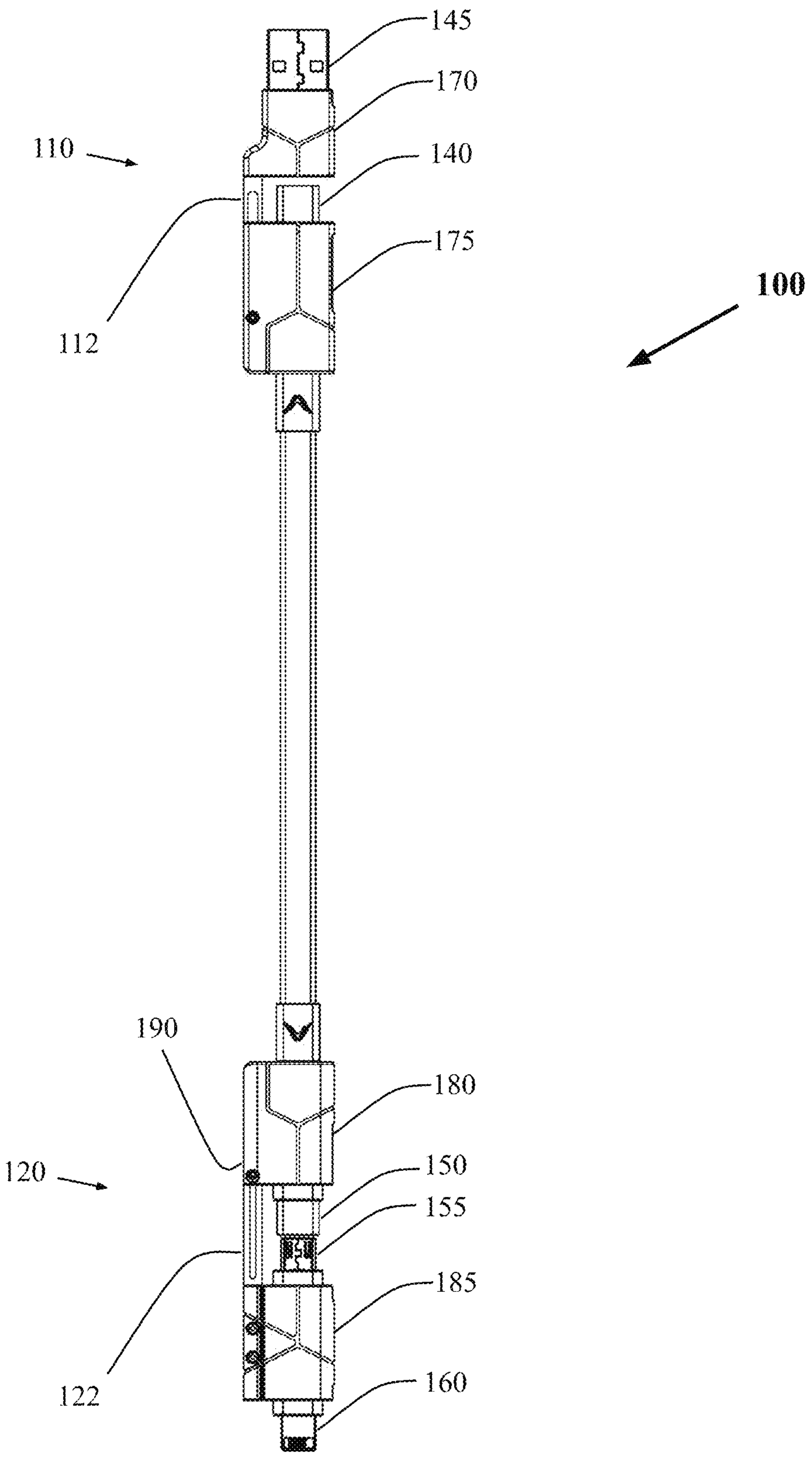
FIG. 2 illustrates a bottom plan view of the proposed assembly in an expanded position according to the preferred embodiment of the present invention.

Referring to the figures and more particularly to FIG. 1 and FIG. 2, the present invention is a universal cable 100 comprising a first end 110 and a second end 120, both having selectively alterable connection types. The cable 100 facilitates the seamless transmission of electrical signals between various connected devices despite differing connection types. As depicted in FIG. 1, the universal cable is sleek and ergonomic, ensuring its compatibility with confined spaces.

Preferred First End Configuration

Figure 4:
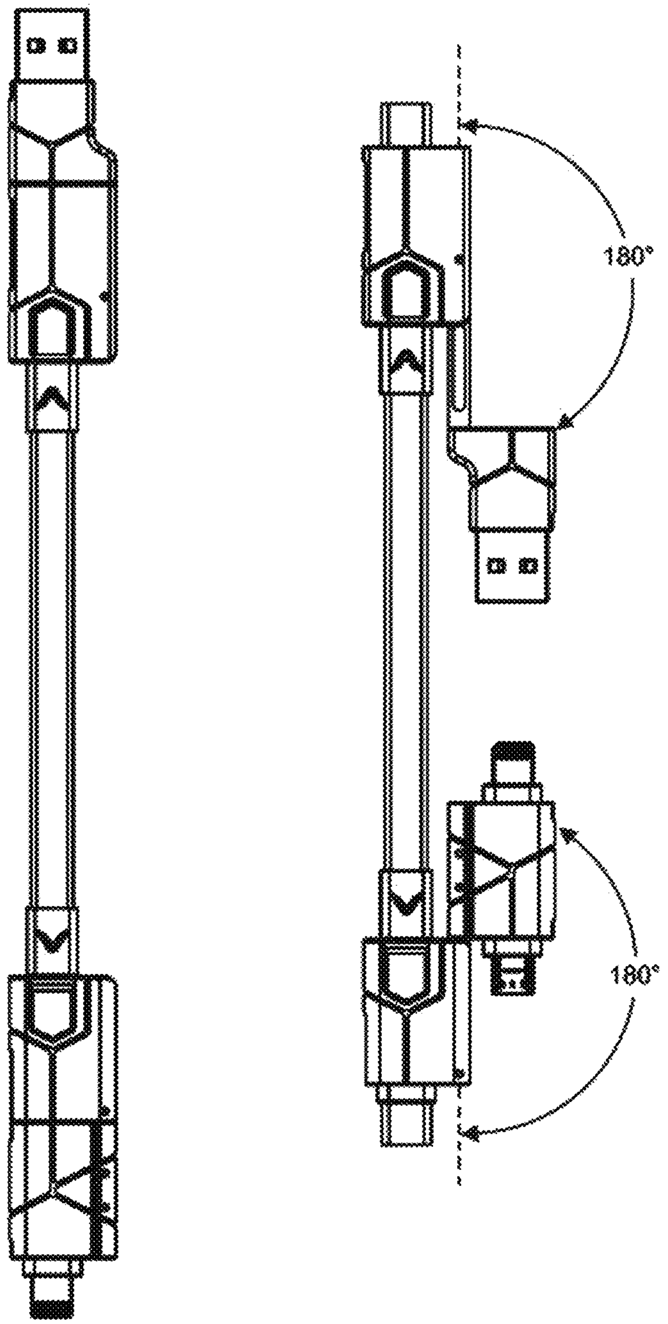
FIG. 4 illustrates the rotational functionality of the distal ends relative to their respective proximal portions according to the preferred embodiment of the present invention.

As shown in FIG. 1 and FIG. 2, the first end 110 of the universal cable 100 is alterable between at least a first 140 and a second 145 connection type through a first connection type selection mechanism 112. This mechanism includes an extendable slide that permits rotation and retraction of the distal portion 170 in order to expose and render the first connection type usable as illustrated in FIG. 4. The extendable slide portion is designed to be readily operable with one hand.

Preferred Second End Configuration

Figure 5:
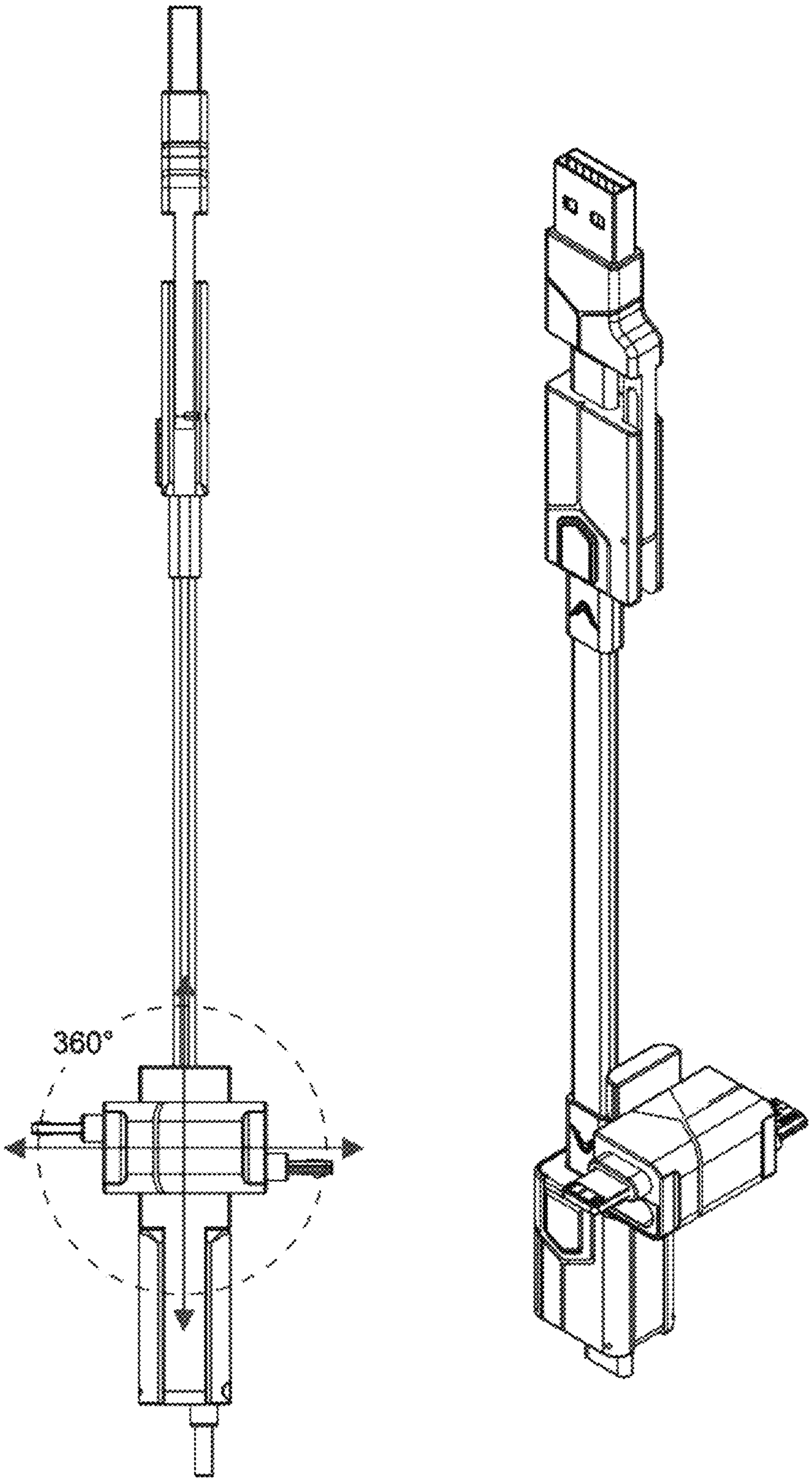
FIG. 5 illustrates the rotational functionality of the second distal end relative to its connection point with the extendable slide according to the preferred embodiment of the present invention.

The second end 120 of the universal cable, detailed in FIG. 1 and FIG. 2, can be altered between a third 150, fourth 155, and fifth 160 connection type via a second connection type selection mechanism 122. Similar to the first end 110, the second end 120 incorporates an extendable slide mechanism, enabling rotation and retraction of the distal portion 185 to expose and render the third connection type usable. FIG. 5 illustrates the 360-degree rotational freedom of the second distal end in relation to its connection point with the extendable slide mechanism.

Connection Types

For both ends, the connection types include, but are not limited to, USB-A, USB-C, Lightning Cable, Micro USB. Additionally, any other well-known or recognized connection types known in the art can readily be implemented for use by the disclosed invention. These varying types ensure universal compatibility with numerous devices and platforms, solidifying the cable's universal designation.

Magnetic Attachment

Figure 3:
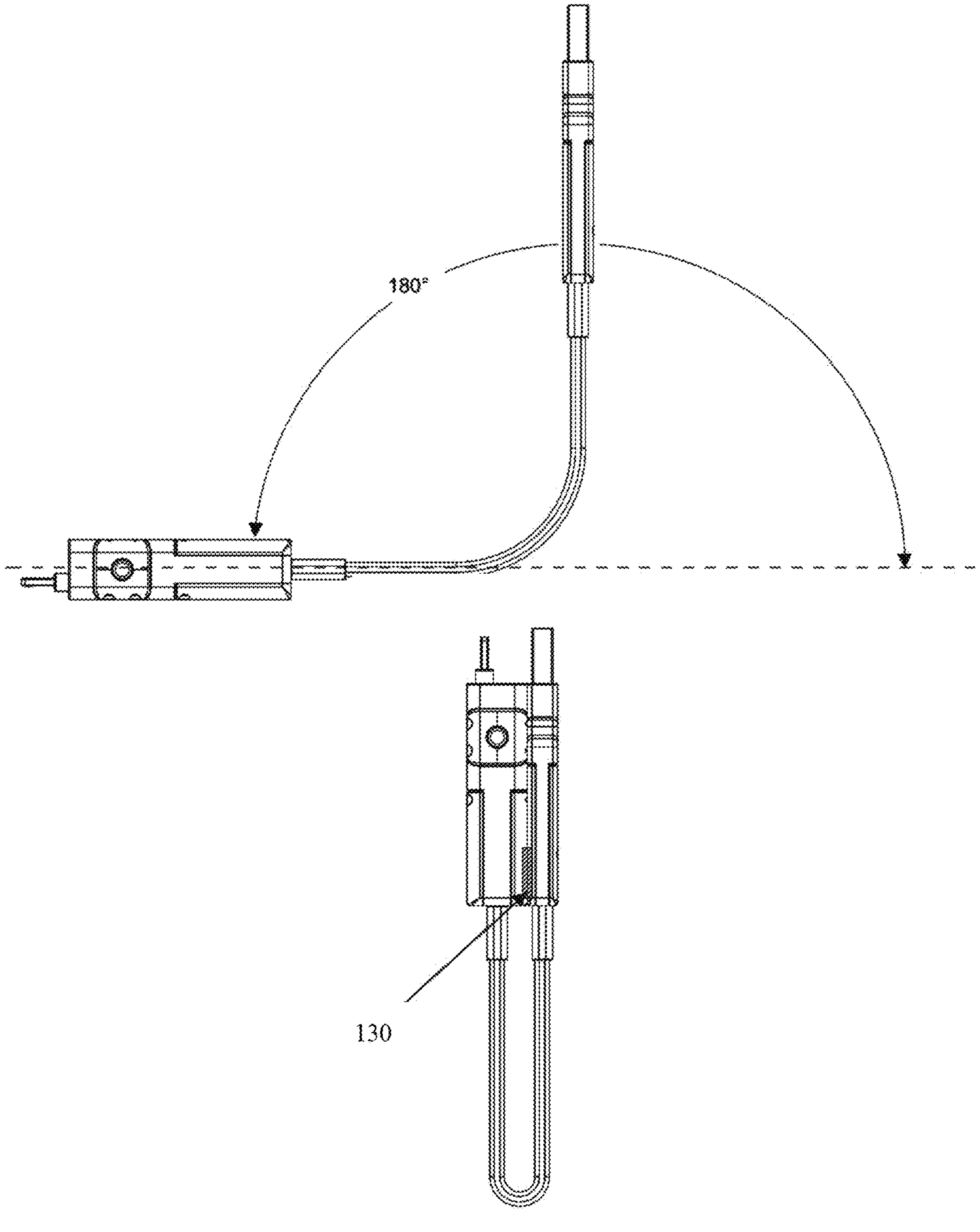
FIG. 3 illustrates the functionality of the magnetic and/or ferromagnetic elements according to the preferred embodiment of the present invention.

FIG. 3 highlights the magnetic or ferromagnetic portions 130 incorporated within the first end and the second end. These portions permit removably attachable connections, ensuring stability and security during utilization while allowing effortless detachment when necessary. When these portions are connected, the universal cable can be securely wrapped around a keychain or the like.

Rotational Limitations

As presented in FIG. 4 and FIG. 5, the rotational functionalities of the distal ends 170, 185 relative to their respective proximal portions 175, 180 are intentionally designed. The distal portions are confined to a 180-degree rotational limit, enhancing the cable's structural integrity.

The distal portion 185 of the second end 120 enjoys a 360-degree rotational freedom, boosting its versatility in connection orientations.

ALTERNATIVE EMBODIMENTS

In some embodiments, both ends of the universal cable may be representative of the preferred first end configuration described previously.

In some embodiments, both ends of the universal cable may be representative of the preferred second end configuration described previously.

In some embodiments, both ends of the universal cable may include more than three connection types.

In some embodiments, the extendable slide mechanisms further comprise a locking mechanism embedded within the extendable slide mechanisms. This feature securely retains the respective distal and proximal portions in a fixed, stable position, ensuring reliable and consistent connections.

In some embodiments, the extendable slide mechanisms further comprise a spring-loaded slider 190 for smooth transitions between different connection types.

While one or more specific embodiments have been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

I claim:

1. A cable comprising:

a first end having at least a first connection type; and a second end opposite the first end selectively alterable among a second connection type, a third connection type, and a fourth connection type via a connection-type selection mechanism;

wherein the second end comprises:

a proximal portion providing the second connection type;

a distal portion providing the third and fourth connection types; and an extendable mechanism operatively coupling the distal portion to the proximal portion;

wherein the extendable mechanism allows the distal portion to extend away from the proximal portion to expose the second connection type for use; and wherein the distal portion is rotationally coupled to the extendable mechanism such that rotation of the distal portion about an axis alternates between at least the third and fourth connection types.

2. The cable of claim 1, wherein the distal portion is rotatable about a first axis fixed relative to the proximal portion.

3. The cable of claim 1, wherein the first end comprises a magnetic coupling element configured to removably attach to a complementary magnetic or ferromagnetic element of the second end.

4. The cable of claim 1, wherein each of the first, second, third, and, fourth connection types is independently selected from the group consisting of USB Type-A, USB Type-C, Lightning, and Micro-USB.

5. The cable of claim 1, wherein the extendable mechanism comprises a slide mechanism including a spring-loaded slider.

6. The cable of claim 1, wherein the extendable mechanism further comprises a locking mechanism configured to retain the distal portion and the proximal portion in a fixed relative position.

7. The cable of claim 2, wherein the distal portion is limited to a rotation of no more than 180 degrees relative to the first axis, and has rotational freedom about a second axis at its connection to the extendable mechanism.

* * * * *